United States Patent [19]

Chuwman

[11] 4,326,607
[45] Apr. 27, 1982

[54] ANTI-RUST STRUCTURE OF AN ADJUST MECHANISM IN A DRUM BRAKE

[75] Inventor: Tsutomu Chuwman, Toyota, Japan

[73] Assignee: Toyota Jidosha Kogyo Kabushiki Kaisha, Aichi, Japan

[21] Appl. No.: 97,426

[22] Filed: Nov. 26, 1979

[30] Foreign Application Priority Data

Mar. 17, 1979 [JP] Japan .............................. 54-34559[U]

[51] Int. Cl.$^3$ ............................................. F16D 65/46
[52] U.S. Cl. ................................ 188/79.5 S; 184/1 R; 188/79.5 SC; 411/418
[58] Field of Search ........... 188/73.3, 79.5 S, 79.5 SC, 188/79.5 SS, 264 B; 184/1 R; 85/1 R, 1 L, 32 V; 411/418, 420, 421, 428

[56] References Cited

U.S. PATENT DOCUMENTS

| 2,645,312 | 7/1953 | Chase | 188/79.5 S |
| 3,156,323 | 11/1964 | Boyer | 188/79.5 SC |
| 3,407,903 | 10/1968 | Sansabrino | 85/1 R |
| 4,027,750 | 6/1977 | Kawamoto et al. | 188/73.3 |
| 4,051,927 | 10/1977 | Karasudani | 188/73.3 |

FOREIGN PATENT DOCUMENTS 11141 10/1902 Austria .............................. 85/32 V Primary Examiner—Edward R. Kazenske
Attorney, Agent, or Firm—Browdy and Neimark

[57] ABSTRACT

An anti-rusting structure of an adjust mechanism in a drum brake, which mechanism functions to compensate stroke increasing of the brake system due to wearing of the brake shoes, for preventing production of rust between an adjust bolt and an adjust nut by means of a skillful water proof device by facilitating the greasing between the two members of the adjust mechanism. In a portion of the adjust bolt where external thread (male screw) is formed, at least one lengthwise groove is axially formed, the length of which groove is determined such that the adjust bolt may not be pushed out by compressed air between the two members, even when the adjust bolt is threaded into the adjust nut by a predetermined amount of length, with sufficient grease being spread between the two members.

5 Claims, 6 Drawing Figures

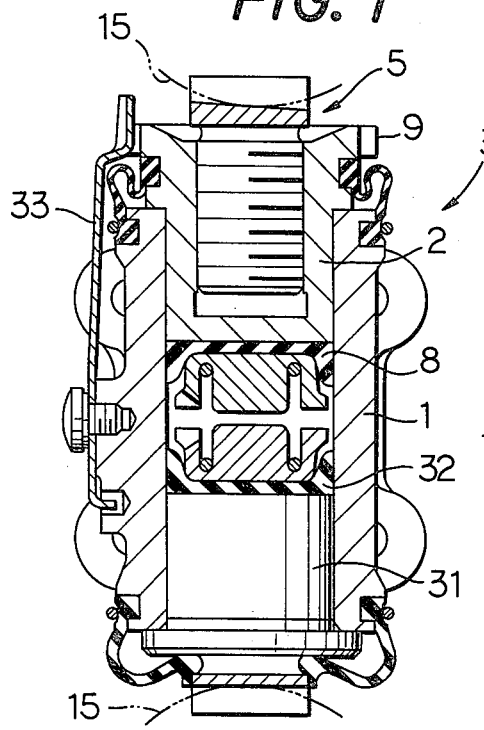
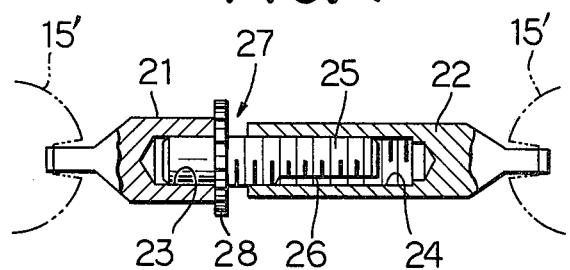
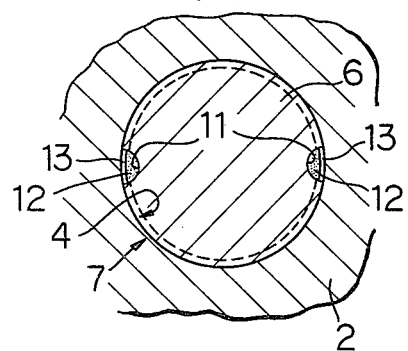
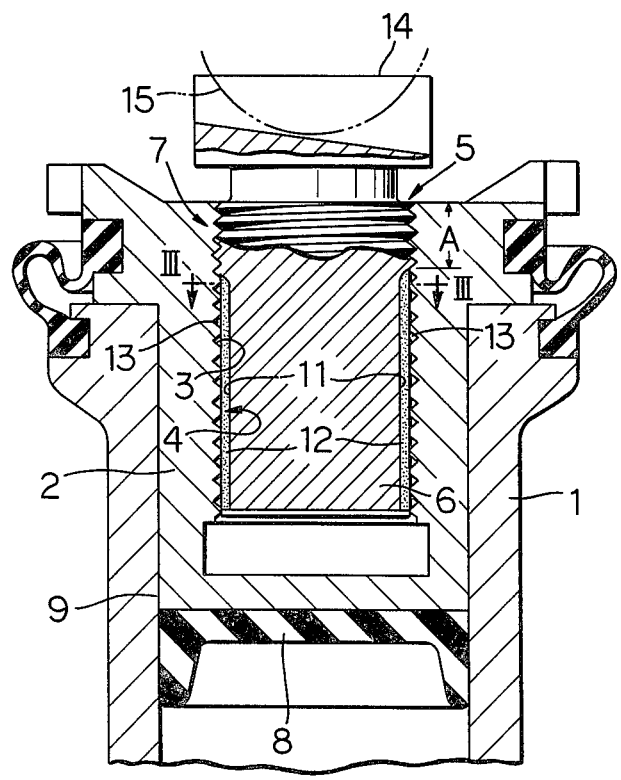

ANTI-RUST STRUCTURE OF AN ADJUST MECHANISM IN A DRUM BRAKE

BACKGROUND OF THE INVENTION

This invention relates to an adjust mechanism of a drum brake generally used in vehicles, and more particularly, to water proof of that mechanism.

It is a common practice in a drum brake to provide an adjust mechanism to compensate for an increase of piston stroke in the wheel cylinder or an increase of lever stroke in the parking brake due to wearing of the brake shoes. The adjust mechanism is usually disposed on a piston of the wheel cylinder, on a strut of a parking brake mechanism, or an anchor, etc., and it generally includes an adjust bolt and an adjust nut. Principle of this mechanism resides in offsetting (compensating) the increasing of stroke in any of the braking mechanism, such as a wheel cylinder, parking brake lever, etc., owing to wearing of the brake shoes, taking advantage of a relative movement of the adjust bolt and the adjust nut caused by a relative rotation of the two members.

It is therefore required that a smooth relative rotation (rotational movement) between the adjust bolt and the adjust nut should be guaranteed at least for the whole period of life of the brake shoes. In a vehicle drum brake which is not necessarily free from ingress of water, the adjust bolt and the adjust nut are liable to the ingress of water into the gap between external thread (male screw) and internal thread (female screw) which may produce rust there. Smooth rotation is thereby often prevented, and even an entire incapability of rotation is not rare.

Such a non-smooth relative rotation or an entire cease of relative rotation between the two members in a manual stroke adjust mechanism requires repair or change of the mechanism itself, and in an auto-adjust mechanism causes an imperfect operation or sometimes an entire cease of operation of the mechanism. This is very dangerous for the vehicle running.

For the purpose of avoiding such a disadvantage, it has conventionally been practiced to spread grease between both threads. It is true that the above is effective in preventing water ingress in between the contact surfaces of the two and in preventing the rust production there. In addition to difficulty of spreading grease evenly or equally over the entire surface of the two members, an excessive amount of grease applied between both threads with the hope of sufficient anti-rust effect often makes venting in the tapped hole unsatisfactory. As the adjust bolt is threaded into the adjust nut, air is confined in the tapped hole and is liable to disadvantageously repulse or push out the adjust bolt, because the air pressure is gradually accumulated there due to the existence of the grease. Making the matter worse, the grease smeared there is pushed outside a great deal by the accumulated air pressure, causing a loss of the grease.

SUMMARY OF THE INVENTION

A primary object of this invention is to provide, in view of the above-mentioned background, a novel adjust mechanism used for a drum brake wherein grease can be smeared evenly and surely between the external thread and the internal thread of the mated adjust bolt and adjust nut for preventing the ingress of water to the mated surfaces.

Another object of this invention is to attain the above-mentioned object without applying grease more than necessary and without making the structure of the adjust mechanism particularly complicated.

The essence of this invention resides in that the adjust bolt is provided with at least one lengthwise groove extending substantially in the axial direction thereof across the external thread, wherein the length of the groove is long enough as to prevent the repulsing or pushing out of grease smeared between the external thread of the adjust bolt and the external thread of the adjust nut due to the accumulated pressure of the air confined in the tapped hole even when the adjust bolt is fully threaded into the adjust nut, with the enough grease being smeared therebetween.

The at least one groove, formed in the adjust nut, functions as a reservoir of grease, when the adjust bolt and the adjust nut are assembled together, with the grease being smeared therebetween, for evenly spreading it between the spiral ridge and the spiral groove of the threads, and concurrently functions as an air escaping vent for the air which may be contained within the tapped hole as the grease gradually spreads between both threads. Through those two functions the groove(s) favorably contributes to the elimination of the disadvantages inevitable to the conventional adjust mechanisms.

BRIEF DESCRIPTION OF THE DRAWINGS

FIG. 1 is an elevational section view of an embodiment of an adjust mechanism in accordance with this invention;

FIG. 2 is an enlargement of an essential part of FIG. 1;

FIG. 3 is a sectional view taken along the line III—III of FIG. 2;

FIG. 4 is an elevational view, partly in section, of another embodiment of the adjust mechanism.

DETAILED DESCRIPTION OF PREFERRED EMBODIMENTS

Figure 6:
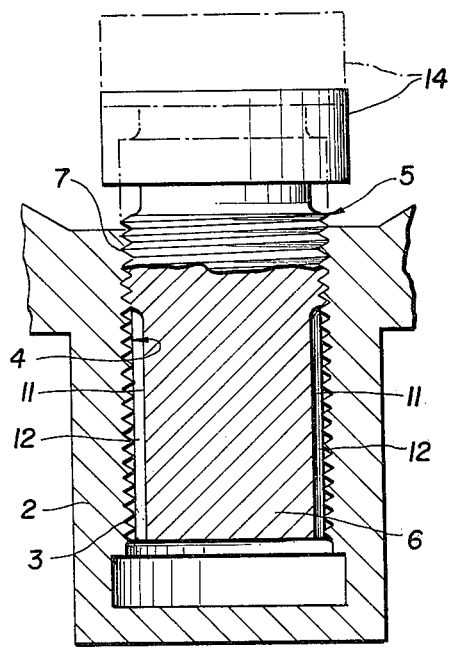
FIG. 6 is an enlarged view similar to FIG. 5 showing another geometrical relationship between the axial groove and the adjust nut when the adjust bolt is in the fully inserted and extended positions.

With reference to the appended drawings preferred embodiments will be described hereunder in detail.

FIG. 1 generally shows a wheel cylinder 30, in section, for expanding a gap between mutually confronted each end portion of a pair of shoes which are movably attached to a backing plate (not shown). In each end portion of a cylinder 1 is slidably fitted a respective piston 31 and 2 together with a piston cup 32 and 8. Since the piston 2 concurrently functions as an adjust nut in this embodiment, it is called hereinafter adjust nut. The adjust nut 2 is securely held, with a lock spring 33, for not being unnecessarily rotated due to vibration of the vehicle and is, on the other hand, capable of being rotated by way of a rotation of a star wheel 9 which is operable by a tool inserted through an adjust hole on the backing plate (not shown). As can be seen in FIGS. 1 and 2, an adjust bolt 5 is threaded into the adjust nut 2. How external thread 7 formed on a leg portion 6 of the adjust bolt 5 are threadedly engaged with internal thread 4 formed on the inner peripheral surface of a tapped hole 3 of the adjust nut 2 is illustrated in FIG. 2.

On the outer peripheral surface of the leg portion 6 of the adjust bolt 5 a pair of lengthwise grooves 11 are formed at polarly apart position from each other, as shown in FIG. 3, which grooves of almost semi-circle shape in section are formed in an axial direction of the leg portion 6. These grooves 11 start from the tip (lower end in FIG. 2) of the leg portion 6 and terminate at an intermediate point of the leg portion 6, which is the lower end of a non-grooved portion (upper portion in FIG. 2) which substantially corresponds to the distance covering five spiral ridges; they are filled with grease 12, leaving only a small empty space 13 in an outwardly opened portion thereof. Between the external thread 7 of the adjust bolt 5 and the internal thread 4 of the adjust nut 2 (between the spiral ridge of the external thread 7 and the spiral groove of the internal thread 4, and between the spiral groove of the external thread 7 and the spiral ridge of the internal thread 4) grease 12 is thoroughly spread all over. A head portion 14 of the adjust bolt 5 is abutted on one end of the shoe 15 which can be slidably contacted with the unillustrated brake drum. The piston 31 is also abutted on one end of the shoe 15 similarly to the adjust nut 2.

Favorable spreading of the grease 12 throughout the entire gap between the external thread 7 and the internal thread 4 is attributable to the pair of lengthwise grooves 11, which function advantageously as a reservoir of the grease 12 and as a vent for allowing the air confined in the tapped hole 3 to escape.

By virtue of the formation of the grooves 11 it has become possible to apply the grease to the adjust bolt 5 and the adjust nut 2, (it is desirable to coat them with the grease up to the brim) prior to assemblying them; as the adjust bolt 5 is gradually threaded into the adjust nut 2, the grease 12 is drawn out of the grooves 11 due to its viscosity for being gradually spread, from the tip of the leg portion 6 and the entrance of the tapped hole 3, throughout the gap between the both threads. As the spreading of the grease 12 has progressed there appears a small empty spaces 13 between the outwardly opened portion of the groove 11 and the internal thread 4 of the adjust nut 2, which empty spaces 13 favorably function as a vent for allowing the air confined within the tapped hole 3 of the adjust nut 2 to go out. It prevents the adjust bolt 5 from being pushed out by the compressed air, because no air is confined to be compressed in the tapped hole 3. Even when the intended empty spaces 13 are partly filled with the grease 12 by any chance, the air which has been confined in the tapped hole 3 will be compressed slightly to produce some pressure and eventually the intended empty spaces 13 are freed from grease by that pressure owing to the enough cross sectional area and well-arranged configuration and the rectilinear shape of the grooves 11, which contributes to making the empty space 13 communicable for venting that slightly compressed air thoroughly.

Upon having so progressed the threading of the adjust bolt 5 into the adjust nut 2 as to accommodate even the root part of the leg portion 6 wherein the grooves are not formed, the adjust bolt 5 will not be pushed out, because the air in the tapped hole 3 is very low in its pressure owing to a small length of the non-grooved part of the leg portion 6 in comparison to the entire length of the leg portion 6. On the contrary, the pressure of the air slightly compressed will favorably spread the grease 12 left in the grooves 12 into the gap between the external thread 7 and internal thread 4. In other words, the grease 12 in the grooves 11 is effectively spread over the whole gap without being expelled out of the tapped hole 3. The length of the grooves 11 may be allowed to be so long as to appear slightly extending out of the adjust nut 2 when the adjust bolt 5 has been fully threaded into the adjust nut 2.

Since the grease 12 initially applied to the grooves 11 is spread throughout the gap between the external thread 7 and the internal thread 4, not only when assemblying the adjust bolt 5 and the adjust nut 2 but also when the adjust mechanism is in operation, water is completely prevented from entering there, which eliminates production of rust, or fastening by the rust, between both threads. Moreover, gradual feeding of the grease 12, during the operation of the adjust mechanism, from the grooves 11 to the gap between both threads contributes very much to effectively utilizing the grease 12 itself.

In this way smooth and proper mutual rotation between the adjust bolt 5 and the adjust nut 2 is guaranteed throughout the whole life period of the shoes 15, which means maintaining of desirable adjusting function of the adjust mechanism.

The above description is concerned to a case wherein the grease 12 is applied to the grooves 11. What is really required is, however, that the grease 12 be spread eventually throughout the gap between both threads 4 and 7 when the two members are threadedly mated. In this sense, sufficient greasing to the internal thread 4 of the adjust nut 2 at first is also allowable. In this case, the grease 12 which has been unevenly smeared over the internal thread 4 will be, as threading of the adjust bolt 5 into the adjust nut 2 progresses, distributed evenly, because the surplus of the grease 12 at one place gets into the grooves 11 before being gradually re-distributed to some other lightly coated places.

Besides, the length A of a part of the leg portion 6 of the adjust bolt 5 wherein the grooves 11 are not formed is determined such that the adjust bolt 5 may not be, even when the same is threaded so deep into the adjust nut 2 as to establish a relative position of the bolt 5 and nut 2 where the shoes 15 are not worn at all, in full consideration of the surface area of the external thread 7 and internal thread 4, amount of grease supplied, and the cross sectional configuration (width and depth) of the grooves 11, necessarily repulsed by the compressed air confined in the tapped hole 3.

Figure 5:
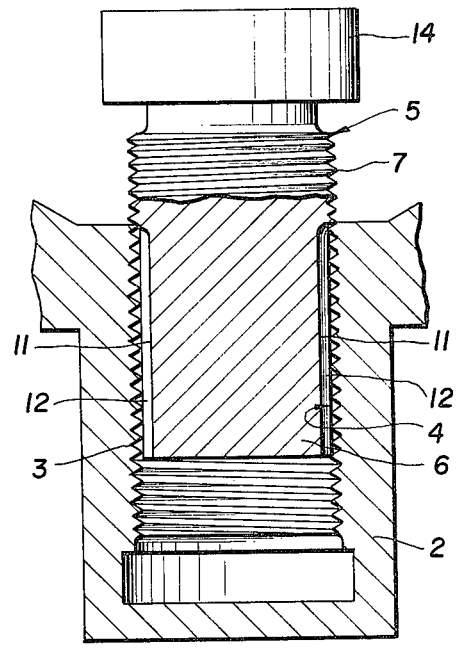
FIG. 5 is an enlarged view showing a geometrical relationship between an axial groove in an adjust bolt and an adjust nut of the embodiment shown in FIG. 1 when the adjust bolt is in the fully extended position.

Additionally speaking, the grooves 11 formed on the external thread 7 may be, when the adjust bolt 5 is protruded out of the adjust nut 2 to the maximum extent, i.e., a state of the bolt established when the greatest allowable limit of wearing of the shoes 15 has been reached, either partly out of or entirely inside of the brim of the adjust nut 2 as shown in FIGS. 6 and 5, respectively. In any case rusting is completely prevented because of sufficient greasing all over the gap between the external thread 7 and the internal thread 4.

Another embodiment will be described next. FIG. 4 shows an adjust link which is usually disposed in a duo-servo drum brake, between each one end portion of a pair of shoes 15', 15', oppositely located from the other end portions where the wheel cylinder is installed. The adjust link is composed of three principal members, a first member 21 in which a round bore 23 is formed, a second member 22 (an adjust nut) in which internal thread is formed, and a connection member 27 (an adjust bolt) for connecting the first and second members 21, 22, on one end of which an external thread 25 is formed. The adjust link is engaged with the pair of shoes 15', 15' with each of the outside end of the first and second members 21, 22 for adjusting the distance between the pair of shoes 15', 15'. On one side of the adjust bolt 27 where external thread 25 is formed a lengthwise groove 26 is formed in an axial direction in accordance with this invention. The distance between the pair of shoes 15', 15' can be adjusted by rotation of a star wheel 28 secured on the adjust bolt 27. This adjust bolt of this kind was conventionally annoyed by the similar disadvantages to those in case of a wheel cylinder and complaints of the same sort were often heard; these problems have been skilfully resolved by the formation of the groove 26. Details of the groove 26 such as the length, depth, configuration, etc. do not need to be repeated here, because of the common principle of the technological idea.

It goes without saying that various modifications and alterations can be made within the scope and spirit of the invention, for example, an adjust mechanism of similar principle can be applied on a strut spanned between a shoe and a parking lever in a parking drum brake or an anchor, and the number of grooves, configuration of the grooves can be flexibly deviced in accordance with the situation wherein this idea is put in practice.

As described above in greater detail, this device is characterized in (a) elimination of waste of the grease; (b) easiness of assemblying of the adjust mechanism; (c) complete water proof of the adjust mechanism; and (d) complete prevention of rusting which guarantees stable adjusting function of the adjust mechanism.

What is claimed is:

1. In an adjusting mechanism, for use in a drum brake, including an externally threaded adjusting bolt and a mating internally threaded adjusting nut having only one open end, said adjusting bolt and said adjusting nut being mutually engageable with and rotatable relative to each other for compensating for an increase in amount of operating stroke of said brake due to wearing of brake shoes thereof, an anti-rust structure comprising:

at least one groove axially extending along a length of said adjusting bolt in at least a part of an externally threaded portion of said adjusting bolt and having one end thereof starting from the tip of the adjusting bolt, the length of said axial groove being such that said adjusting bolt may not be pushed outwardly of said adjusting nut toward said open end thereof by compressed air confined and produced between said adjusting bolt and said adjusting nut even when said adjusting bolt has been threaded into said adjusting nut to such a maximum extent as to establish a relative position of said adjusting bolt and nut where said brake shoes are not worn at all, irrespective of distributing conditions of a grease being applied between said adjusting bolt and nut, and said length of said axial groove also being such that the other end of said axial groove is not positioned outside a brim of said adjusting nut when said adjusting bolt has been threaded into said adjusting nut to said maximum extent.

2. An anti-rust structure in accordance with claim 1, wherein said at last one axial groove is a pair of axial grooves disposed at polarly opposite positions in said externally threaded portion of said adjusting bolt.

3. An anti-rust structure in accordance with claim 1, wherein said length of said axial groove is further determined such that said other end of said axial groove is not positioned outside said brim of said adjusting nut when said adjusting bolt has been extended from said adjusting nut to such a maximum extent as to establish a relative position of said adjusting bolt and nut where said brake shoes have been worn out to the greatest allowable limit.

4. An anti-rust structure in accordance with claim 1, wherein said length of said axial groove is further determined such that said other end of said axial groove is positioned outside said brim of said adjusting nut when said adjusting bolt has been extended from said adjusting nut to such a maximum extent as to establish a relative position of said adjusting bolt and nut when said brake shoes have been worn out to the greatest allowable limit.

5. An anti-rust structure in accordance with claim 1, wherein said axial groove has a cross sectional area and configuration such that an empty space functioning as an air venting passage can be formed therein without said grease being expelled out of said adjusting nut by said compressed air even when said axial groove is initially filled with said grease which is subsequently distributed between said adjusting bolt and said adjusting nut.

* * * * *